(12) United States Patent
Furuya et al.

(10) Patent No.: US 9,372,314 B2
(45) Date of Patent: Jun. 21, 2016

(54) OPTICAL SIGNAL PROCESSOR AND OPTICAL ASSEMBLY

(71) Applicant: SUMITOMO ELECTRIC INDUSTRIES, LTD., Osaka (JP)

(72) Inventors: Akira Furuya, Hadano (JP); Yasunori Murakami, Hiratsuka (JP); Masahiro Shibata, Fujisawa (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/867,873

(22) Filed: Sep. 28, 2015

(65) Prior Publication Data

US 2016/0091677 A1     Mar. 31, 2016

(30) Foreign Application Priority Data

Sep. 29, 2014   (JP) ................................. 2014-198183

(51) Int. Cl.
| | | |
|---|---|---|
| *G02B 6/43* | (2006.01) | |
| *G02B 6/42* | (2006.01) | |
| *G02B 6/34* | (2006.01) | |

(52) U.S. Cl.
CPC .... *G02B 6/424* (2013.01); *G02B 6/34* (2013.01); *G02B 6/4216* (2013.01); *G02B 6/4249* (2013.01); *G02B 6/4257* (2013.01)

(58) Field of Classification Search
None
See application file for complete search history.

(56) References Cited

U.S. PATENT DOCUMENTS

| | | | | |
|---|---|---|---|---|
| 6,116,791 A * | 9/2000 | Laninga | ............... | G02B 6/3829 385/83 |
| 6,390,690 B1 * | 5/2002 | Meis | ................... | G02B 6/3897 385/147 |
| 6,789,953 B1 * | 9/2004 | deJong | ............... | G02B 6/3825 385/73 |
| 8,272,788 B2 * | 9/2012 | Ohta | ..................... | G02B 6/381 385/32 |
| 2002/0197046 A1 * | 12/2002 | Tourne | ............... | G02B 6/3887 385/136 |
| 2007/0237449 A1 * | 10/2007 | Aoki | ................... | G02B 6/4292 385/14 |
| 2007/0292081 A1 * | 12/2007 | Hashimoto | .......... | G02B 6/4277 385/52 |
| 2008/0205894 A1 * | 8/2008 | Aoki | ..................... | G02B 6/421 398/135 |
| 2008/0240657 A1 * | 10/2008 | Dean | .................... | G02B 6/3829 385/78 |
| 2010/0178006 A1 * | 7/2010 | Nishimura | .......... | G02B 6/4202 385/55 |
| 2011/0026888 A1 * | 2/2011 | Nekado | ............... | G02B 6/4201 385/92 |
| 2011/0042553 A1 * | 2/2011 | Masini | ..................... | H03F 3/08 250/214 A |

OTHER PUBLICATIONS

R. Krishnamurthy, "The Luxtera CMOS Integrated Photonic Chip in a Molex Cable", chipworks, Dec. 3, 2012, URL:http://www.chipworks.com/blog/technologyblog/2012/12/03/the-luxtera-cmos-integrated-photonic-chip-in-a-molex-cable/.

* cited by examiner

*Primary Examiner* — Mike Stahl
(74) *Attorney, Agent, or Firm* — Smith, Gambrell & Russell, LLP.

(57) ABSTRACT

An optical signal processor including: optical fibers arranged in a first direction, each optical fiber having a side surface; a flexible holding member covering the side surfaces of the optical fibers; a first optical connector having a first end face and a second end face; a second optical connector having a third end face and a fourth end face; a supporting block disposed under the first optical connector; and an optical integrated circuit including optical couplers facing the third end face of the second optical connector and optical waveguides, the optical couplers being optically coupled to the optical fibers. The optical fibers extend from the second end face in a second direction. The optical fibers extend from the fourth end face in a third direction that intersects with the second direction. The flexible holding member has a bending portion located between the first optical connector and the second optical connector.

7 Claims, 8 Drawing Sheets

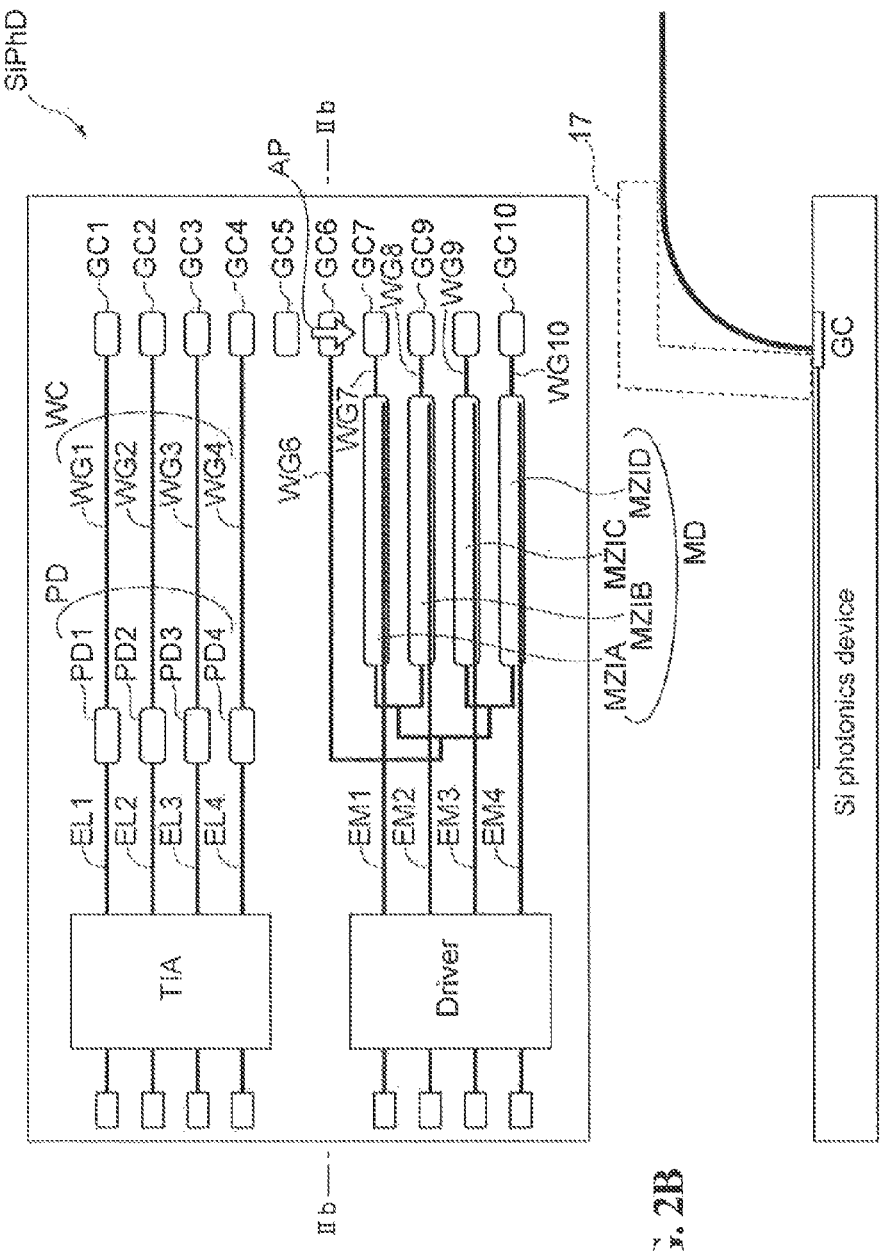

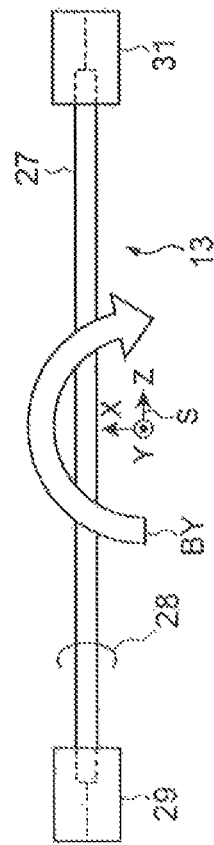
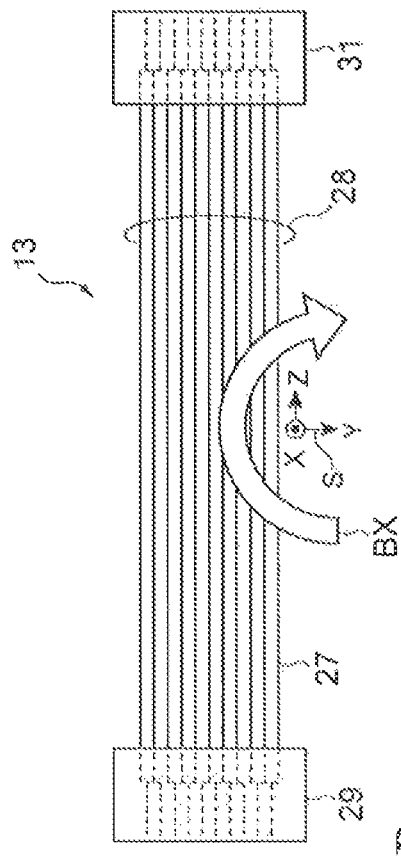
FIG. 5A
FIG. 5B
FIG. 5C

OPTICAL SIGNAL PROCESSOR AND OPTICAL ASSEMBLY

BACKGROUND OF THE INVENTION

1. Field of the Invention

The present invention relates to an optical signal processor and an optical assembly.

2. Description of the Related Art

Non Patent Document 1 (R. Krishnamurthy, The Luxtera CMOS Integrated Photonic Chip in a Molex Cable, [online], chipworks, 2012 Dec. 3, [searched Apr. 11, 2014], URL:http//www.chipworks.com/blog/technologyblog/2012 Dec. 3/the-luxtera-cmos-integrated-photonic-chip-in-a-molex-cable/) discloses a technology for mounting optical fibers on a complementary metal oxide semiconductor (CMOS) integrated photonic chip. The CMOS integrated photonic chip is a chip including a Si substrate on which complementary metal oxide semiconductor (CMOS) devices, which perform digital signal processing, and optical waveguides, which perform optical signal processing, are integrated. The CMOS integrated photonic chip according to Non Patent Document 1 includes polarization grating couplers (PGCs) from which polarized light is emitted. Each PGC has an optical fiber bonded to a surface thereof, and the polarized light emitted from the PGC is optically coupled to the core of the optical fiber.

Polarization maintaining fibers (PMFs) are used to transmit polarized light through optical fibers. A polarization maintaining fiber is an optical fiber having a stress imparting part therein. A stress applied to the core of the optical fiber causes birefringence in the core of the optical fiber. Due to the birefringence, the polarization maintaining fiber is capable of propagating the polarized light while maintaining the polarization of the polarized light.

SUMMARY OF THE INVENTION

The polarization maintaining fiber has a polarization maintaining characteristic based on the stress generated by the stress imparting part disposed in the optical fiber. When an undesirable external stress is applied to the optical fiber, the polarization of the polarized light varies. An undesirable external stress is applied to the polarization maintaining fiber when the fiber is bent at a small bending radius.

To arrange a CMOS integrated photonic chip and optical fibers in a small space, the optical fibers to be bonded are preferably bent at a small bending radius.

According to an aspect of the present invention, an optical signal processor includes a plurality of optical fibers arranged in a first direction, each optical fiber having a side surface and two end surfaces; a flexible holding member covering the side surfaces of the plurality of optical fibers; a first optical connector having a first end face and a second end face opposite to the first end face; a second optical connector having a third end face and a fourth end face opposite to the third end face; a supporting block disposed under the first optical connector; and an optical integrated circuit including a plurality of optical couplers facing the third end face of the second optical connector and a plurality of optical waveguides, the plurality of optical couplers being optically coupled to the plurality of optical fibers. The plurality of optical fibers extends from the second end face of the first optical connector in a second direction. The second direction intersects with the first direction. The plurality of optical fibers extends from the fourth end face of the second optical connector in a third direction. The third direction intersects with the second direction. The flexible holding member has a bending portion located between the first optical connector and the second optical connector.

According to another aspect of the present invention, an optical assembly includes a plurality of optical fibers arranged in a first direction, each optical fiber having a side surface and two end surfaces; a flexible holding member that covers the side surfaces of the plurality of optical fibers; a first optical connector having a first end face and a second end face opposite to the first end face; a second optical connector having a third end face and a fourth end face opposite to the third end face; and a cover plate connected to the second optical connector, the cover plate covering the flexible holding member. The plurality of optical fibers extends from the second end face of the first optical connector in a second direction. The second direction intersects with the first direction. The plurality of optical fibers extends from the fourth end face of the second optical connector in a third direction. The third direction intersects with the second direction. The flexible holding member has a bending portion located between the first optical connector and the second optical connector. The cover plate includes a first surface extending in the second direction and a second surface extending in the third direction. The second surface is connected to the first surface.

BRIEF DESCRIPTION OF THE DRAWINGS

FIGS. 2A and 2B illustrate an example of an optical integrated device according to the embodiment.

FIGS. 5A to 5C illustrate the manner in which the optical connector unit according to the embodiment is bent.

DESCRIPTION OF THE PREFERRED EMBODIMENTS

Figure 1:
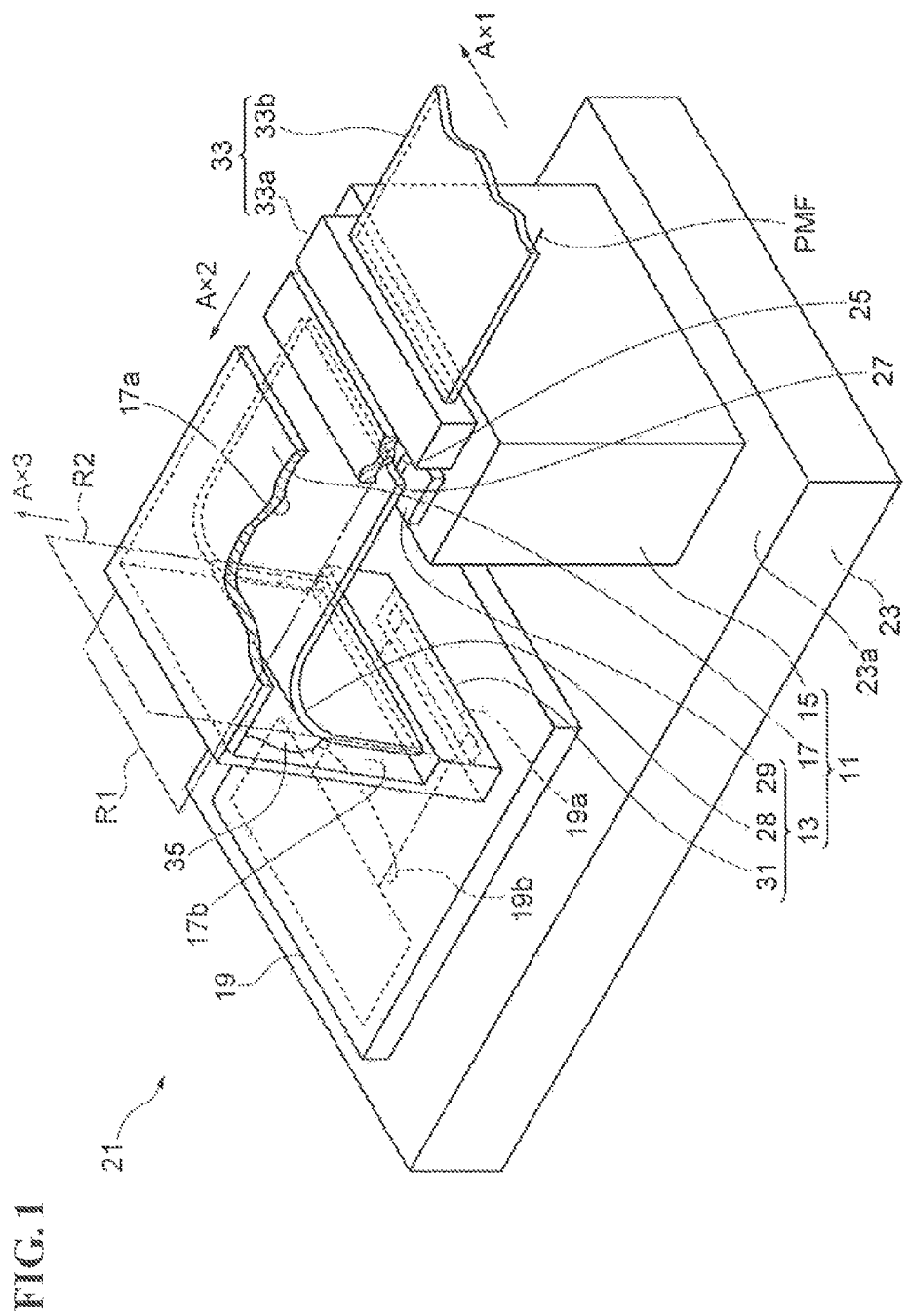
FIG. 1 illustrates an example of an optical signal processor and an optical assembly according to an embodiment.

Embodiments will now be described.

An optical signal processor according to an embodiment includes (a) a plurality of optical fibers arranged in a first direction, each optical fiber having a side surface and two end surfaces; (b) a flexible holding member covering the side surfaces of the plurality of optical fibers; (c) a first optical connector having a first end face and a second end face opposite to the first end face; (d) a second optical connector having a third end face and a fourth end face opposite to the third end face; (e) a supporting block disposed under the first optical connector; and (f) an optical integrated circuit including a plurality of optical couplers facing the third end face of the second optical connector and a plurality of optical waveguides, the plurality of optical couplers being optically coupled to the plurality of optical fibers. The plurality of optical fibers extends from the second end face of the first optical connector in a second direction. The second direction intersects with the first direction. The plurality of optical fibers extends from the fourth end face of the second optical connector in a third direction. The third direction intersects with the second direction. The flexible holding member has a bending portion located between the first optical connector and the second optical connector.

Each optical fiber of the optical signal processor includes no stress imparting part therein, and substantially has no polarization maintaining characteristic when the optical fiber is not bent. The optical couplers of the optical integrated circuit may be optically coupled to the second optical connector without matching the direction of polarization of the polarized light emitted from the optical couplers with the polarization maintaining direction of the optical fibers. The optical fibers extend from the first optical connector in the second direction, and are bent together with the bending portion of the flexible holding member. The optical fibers extend from the second optical connector in the third direction. The flexible holding member maintains the arrangement of the optical fibers and the manner in which the optical fibers are bent. In addition, the flexible holding member applies a bending stress large enough to impart the polarization maintaining characteristic to the optical fibers. Due to the bending stress applied to the optical fibers, the optical fibers show the polarization maintaining characteristic. Since the optical fibers are arranged, the optical fibers show the same degree of polarization maintaining characteristic in response to the stress applied thereto by the flexible holding member. Since the arrangement of optical fiber is maintained by the flexible holding member, the optical fibers are bent in almost the same bending radius. The optical fibers receive a comparable strength of stress created by the bending. Since the optical fibers having no stress imparting part therein are used, the polarization maintaining characteristic does not vary as in the case where polarization maintaining fibers are used.

In the optical signal processor according to the embodiment, the plurality of optical fibers is optically connected to a plurality of polarization maintaining fibers via the first end face of the first optical connector. The plurality of couplers of the optical integrated circuit transmits polarized light via the third end face of the second optical coupler.

The optical signal processor according to the embodiment may include a cover plate that covers the bending portion of the flexible holding member. The cover plate includes a first surface extending in the second direction and a second surface extending in the third direction The bending portion is protected from a disturbance by the cover plate. Therefore, the plane of polarization of the light that propagates through the optical fibers is reliably maintained.

In the optical signal processor according to the embodiment, the cover plate may include a first surface extending in the second direction and a second surface extending in the third direction. The first surface and the second surface are connected to each other. The first surface is in contact with the flexible holding member at least at one portion between the first optical connector and the bending portion. The second surface is in contact with the the flexible holding member at least at one portion between the second optical connector and the bending portion. As the first and second surfaces guide the extending direction of the flexible holding member, the direction in which the optical fibers extend is prevented from being shifted from the second direction or the third direction. Therefore, the plane of polarization of the light that propagates through the optical fibers is reliably maintained.

In the optical signal processor according to the embodiment, one end surface of each optical fiber is exposed at the first end face of the first optical connector, and the other end surface of each optical fiber is exposed at the third end surface of the second optical connector.

The optical signal processor according to the embodiment may include a base having a main surface, wherein the supporting block and the optical integrated circuit are disposed on the main surface of the base.

In the optical signal processor according to the embodiment, the optical integrated circuit may include a silicon photonics device, and the plurality of optical couplers may include a plurality of grating couplers. With this optical signal processor, the polarized light may be processed by using the silicon photonics device. The grating couplers are capable of transmitting or receiving the polarized light depending on the orientations thereof.

An optical assembly according to an embodiment includes (a) a plurality of optical fibers arranged in a first direction, each optical fiber having a side surface and two end surfaces; (b) a flexible holding member that covers the side surfaces of the plurality of optical fibers; (c) a first optical connector having a first end face and a second end face opposite to the first end face; (d) a second optical connector having a third end face and a fourth end face opposite to the first end face; and (e) a cover plate connected to the second optical connector, the cover plate covering the flexible holding member. The plurality of optical fibers extend from the second end face of the first optical connector in a second direction. The second direction intersects with the first direction. The plurality of optical fibers extend from the fourth end face of the second optical connector in a third direction. The third direction intersects with the second direction. The flexible holding member has a bending portion located between the first optical connector and the second optical connector. The cover plate includes a first surface extending in the second direction and a second surface extending in the third direction. The second surface is connected to the first surface.

Each optical fiber of the optical assembly includes no stress imparting part therein, and substantially has no polarization maintaining characteristic when the optical fiber is not bent. The optical fibers extend from the first optical connector in the second direction, and are bent together with the bending portion of the flexible holding member. The optical fibers extend from the second optical connector in the third direction. The flexible holding member is bent by the cover plate. The flexible holding member maintains the arrangement of the optical fibers and the manner in which the optical fibers are bent. In addition, the flexible holding member applies a bending strength large enough to impart the polarization maintaining characteristic to the optical fibers. Due to the bending stress applied to the optical fibers, the optical fibers show the polarization maintaining characteristic. Since the optical fibers are arranged, the optical fibers show the same degree of polarization maintaining characteristic in response to the stress applied thereto by the flexible holding member. Since the optical fibers having no stress imparting part therein are used, the polarization maintaining characteristic does not vary as in the case where polarization maintaining fibers are used.

The findings of the present invention can be readily understood from detailed description given below with reference to the accompanying drawings, which illustrate examples. An optical signal processor and an optical assembly according to an embodiment of the present invention will be described with reference to the accompanying drawings. Whenever possible, the same components are denoted by the same reference numerals.

FIG. 1 illustrates an optical signal processor 21 and an optical assembly 11 according to the embodiment. The optical assembly 11 includes an optical connector unit 13, a supporting block 15, and a cover plate 17. The optical signal processor 21 includes the optical assembly 11 and an optical integrated circuit 19. In this embodiment, the optical signal processor 21 also includes a base 23 that supports the optical assembly 11 and the optical integrated circuit 19. The optical assembly 11 and the optical integrated circuit 19 are mounted on a surface 23a of the base 23. The surface 23a extends along a reference plane. The optical integrated circuit 19 includes, for example, an optical device that processes polarized light. In this embodiment, the optical integrated circuit 19 includes a plurality of optical couplers 19a that receive or transmit polarized light and a plurality of optical waveguides 19b that allows the polarized light to propagate therethrough. The optical couplers 19a are arranged along a principal surface of the optical integrated circuit 19. Each optical coupler 19a includes, for example, a grating coupler or an oblique polished end surface of an optical waveguide. In this embodiment, each optical coupler 19a is a grating coupler. The grating coupler transmits and receives polarized light. The optical couplers 19a are optically coupled to optical waveguides 19b.

The optical connector unit 13 includes a plurality of single-mode optical fibers 25 arranged in a single line along a first direction Ax1. The optical connector unit 13 includes a flexible holding member 27 that maintains the arrangement of the optical fibers 25. The flexible holding member 27 includes, for example, a urethane acrylate resin. The single-mode optical fibers 25 and the flexible holding member 27 form an optical fiber bundle 28. The optical fiber bundle 28 is configured such that the single flexible holding member 27 covers a side surface of each optical fiber 25 in a region excluding one and the other ends of the optical fiber 25, thereby maintaining the arrangement of the optical fibers 25. Preferably, the optical connector unit 13 further includes a first optical connector 29. The first optical connector 29 optically couples an external optical component 33 to the optical fibers 25. The external optical component 33 includes an external optical connector 33a to be connected to the first optical connector 29 and polarization maintaining fiber tape 33b. The polarization maintaining fiber tape 33b includes an array of a plurality of polarization maintaining fibers (PMFs). Alternatively, the polarization maintaining fiber tape 33b may include an array of polarization maintaining fibers (PMFs) and single-mode optical fibers. The optical connector unit 13 further includes a second optical connector 31. The second optical connector 31 optically couples the array of the optical couplers 19a of the optical integrated circuit 19 to the array of the single-mode optical fibers 25.

The first optical connector 29 is provided at one end of the array of the optical fibers 25. The first optical connector 29 has a first end face and a second end face. One end surface of each optical fiber 25 is exposed to the first end face of the first optical connector 29. The one end surface of the optical fiber 25 is optically coupled to the polarization maintaining fiber (PMF). The second optical connector 31 has a third end face and a fourth end face. The other end surface of each optical fiber 25 is exposed to the third end face of the second optical connector 31. The other end of the optical fiber 25 is optically coupled to the optical couplers 19a of the optical integrated circuit 19. The optical fibers 25 have no stress imparting part therein. The optical fibers 25 are single-mode optical fibers that have no polarization maintaining function under general use conditions.

The supporting block 15 supports the first optical connector 29 such that the optical fibers 25 included in the optical connector unit 13 can be optically coupled to the polarization maintaining fibers (PMFs) by the first optical connector 29. In this embodiment, the supporting block 15 also supports the external optical connector 33a such that the polarization maintaining fibers (PMFs) included in the external optical component 33 can be optically coupled to the optical fibers 25 by the external optical connector 33a.

The cover plate 17 is disposed outside of the flexible holding member 27 of the optical connector unit 13. The cover plate 17 maintains the bent shape of the flexible holding member 27. The cover plate 17 is in contact with the flexible holding member 27 at least one portion between the first optical connector 29 and the second optical connector 31. The optical fibers 25, which extend from the first optical connector 29 on the supporting block 15 to the second optical connector 31, are also bent at a bending radius that is no smaller than a desired bending radius. As described below, the bent state is maintained, and the bending radius is controlled by the cover plate 17. For example, the optical fibers 25 extend from the first optical connector 29 on the supporting block 15 in a second direction Ax2. The optical fibers 25 are bent so as to extend toward the principal surface of the optical integrated circuit 19 in a third direction Ax3. The cover plate 17 supports the optical connector unit 13 so that the optical fibers 25 extend from the first optical connector 29 in the second direction Ax2, and also extend from the second optical connector 31 in the third direction Ax3. The third direction Ax3 is at an angle greater than zero with respect to the second direction Ax2. The shape of the flexible holding member 27 is maintained so that the shape of the optical fibers 25 held by the flexible holding member 27 is maintained (for example, the bending radius and the angle between the second and third directions are maintained). The first optical connector 29 holds one end of each optical fiber 25 such that the optical fibers 25 are arranged in a single line. The one end of each optical fiber 25 is exposed at an end face of the first optical connector 29. The second optical connector 31 holds the other end of each optical fiber 25 such that the optical fibers 25 are arranged in a single line. The other end of each optical fiber 25 is exposed at an end face of the second optical connector 31.

According to the optical assembly 11 and the optical signal processor 21, the optical connector unit 13 includes the optical fibers 25, and the optical fibers 25 substantially have no polarization maintaining characteristic when the optical fibers 25 are not bent. The array of the optical fibers 25 included in the optical connector unit 13 extends from the first optical connector 29 in the second direction Ax2 on the supporting block 15. The array of the optical fibers 25 also extends from the second optical connector 31 in the third direction Ax3 on the optical integrated circuit 19. The cover plate 17 supports the optical fibers 25 that extend in the directions Ax2 and Ax3. Since the optical fibers 25 are supported in this manner, the second optical connector 31 of the optical connector unit 13 is optically connected to the optical integrated circuit 19 in such a state that the optical fibers 25 included in the optical connector unit 13 are bent. The flexible holding member 27 of the optical connector unit 13 applies a bending stress to the optical fibers 25 included in the optical connector unit 13 while the arrangement of the optical fibers 25 and the manner in which the optical fibers 25 are bent are maintained. The optical fibers 25 receive substantially the same bending stress from the flexible holding member 27.

Therefore, the optical fibers 25 included in the optical connector unit 13 exhibit similar polarization maintaining characteristics based on the stress applied thereto by the flexible holding member 27. The polarization maintaining fibers (PMFs) are optically coupled to the optical integrated circuit 19 by the optical fibers 25 included in the optical connector unit 13. Since a bending portion that is preferably bent at a small bending radius at a location near the optical integrated circuit 19 includes the optical fibers 25, which have no stress imparting part therein, the polarization maintaining characteristic does not vary as in the case where the polarization maintaining fibers are bent.

In the embodiment illustrated in FIG. 1, the cover plate 17 is connected to the second optical connector 31 of the optical connector unit 13. In this case, the cover plate 17 determines the direction in which the optical fiber bundle 28 extends from the second optical connector 31. Instead of being connected to the second optical connector 31, the cover plate 17 may be connected to the first optical connector 29, the optical integrated circuit 19, or the base 23. Although the cover plate 17 is illustrated as a component separate from the second optical connector 31 in this embodiment, the cover plate 17 may instead be integrated with the second optical connector 31. Alternatively, the cover plate 17 may be integrated with the first optical connector 29, or with both the first optical connector 29 and the second optical connector 31.

In the optical assembly 11 and the optical signal processor 21, the optical connector unit 13 includes the optical fiber tape including the array of the single-mode optical fibers 25 and the flexible holding member 27. The flexible holding member 27 included in the optical fiber tape holds the side surface of each optical fiber 25 and connects the optical fibers 25 arranged in a single line. Owing to the flexible holding member 27, the optical fibers 25 are arranged one-dimensionally in a first direction that crosses the direction in which the optical fibers 25 extend. More specifically, the flexible holding member 27 extends along the side surfaces of the optical fibers 25 in the direction of the waveguide axes of the optical fibers 25. The optical fiber tape is configured such that the optical fibers 25, which are arranged next to each other, receive a stress corresponding to warping and/or bending of the flexible holding member 27.

The cover plate 17 has a first support surface 17a and a second support surface 17b. The first support surface 17a and the second support surface 17b support the flexible holding member 27 of the optical connector unit 13 in a bent state. In this embodiment, the first support surface 17a may extend along a first reference plane R1, and the first reference plane R1 is parallel to the first direction Ax1 and the second direction Ax2. The second support surface 17b may extend along a second reference plane R2, and the second reference plane R2 is parallel to the first direction Ax1 and the third direction Ax3.

The first support surface 17a guides a surface of a portion of the flexible holding member 27 of the optical fiber bundle 28 that extends from the first optical connector 29. The second support surface 17b guides a surface of a portion of the flexible holding member 27 of the optical fiber bundle 28 that extends from the second optical connector 31. Since the first support surface 17a and the second support surface 17b extend in different directions, the first support surface 17a and the second support surface 17b determine the shape of the optical fiber bundle 28 in the optical assembly 11, that is, in the optical signal processor 21. An adhesive member 35 may be used to reliably maintain the shape of the optical fiber bundle 28. The adhesive member 35 may be an epoxy adhesive.

Typically, the optical integrated circuit 19 includes a silicon photonics device. In the optical signal processor 21, the polarized light may be processed by using a silicon photonics device. The optical integrated circuit 19 includes, for example, photodiodes as optical elements of an optical receiver. The optical integrated circuit 19 also includes a trans-impedance amplifier as an electric element of the optical receiver. In this optical signal processor 21, the optical integrated circuit 19 is capable of processing the polarized light received through at least some of the optical fibers 25 included in the optical connector unit 13. Alternatively, the optical integrated circuit 19 may include, for example, optical modulators as optical elements of an optical transmitter. The optical integrated circuit 19 also includes a driver circuit for driving the optical modulators. In this optical signal processor 21, the optical integrated circuit 19 is capable of processing the polarized light to be output through at least some of the optical fibers 25 included in the optical connector unit 13. The optical integrated circuit 19 may include both the optical elements of the optical receiver and the optical elements of the optical transmitter.

FIGS. 2A and 2B illustrate an example of an optical integrated device. FIG. 2A is a plan view of a silicon photonics device SiPhD that functions as the optical integrated circuit 19. FIG. 2B is a sectional view of the silicon photonics device SiPhD illustrated in FIG. 2A taken along line IIb-IIb. Referring to FIG. 2A, the silicon photonics device SiPhD includes a plurality of grating couplers (for example, ten grating couplers) GC1, GC2, GC3, GC4, GC5, GC6, GC7, GC8, GC9, and GC10 as the optical couplers 19a. To enable the grating couplers to be appropriately coupled to the polarized light, the grating couplers are formed in the same orientation (for example, the orientation shown by the arrow AP in FIG. 2A). In this embodiment, the arrow AP extends in the direction in which the grating couplers GC1 to CG10 are arranged.

The grating couplers GC1 to GC4 are provided for an optical receiver. Signal light received through the grating couplers GC1 to CG4 is supplied to a light receiving device PD through an optical circuit WC. In this embodiment, the optical circuit WC includes optical waveguides WG1 to WG4. The grating couplers GC1 to GC4 are optically coupled to photodiodes PD1 to PD4 by the optical waveguides WG1 to WG4, respectively. The photodiodes PD1 to PD4 are connected to an electric circuit TIA (for example, a trans-impedance amplifier) by metal wires EL1 to EL4. The electric circuit TIA subjects electric signals (for example, photocurrents) received from the photodiodes PD1 to PD4 to processes such as current-voltage conversion and amplification, and generates electric signals corresponding to the received signal light.

The grating couplers GC6 to CG10 are provided for an optical transmitter. In this embodiment, a laser beam propagates through one of the optical fibers 25 and reaches the grating coupler GC6. The laser beam is supplied from the grating coupler GC6 to a plurality of optical modulators MD. The optical modulators MD include, for example, Mach-Zehnder modulators MZIA, MZIB, MZIC, and MZID. The Mach-Zehnder modulators MZIA, MZIB, MZIC, and MZID receive electric signals EM1 to EM4 from a driver circuit Driver, and generate a plurality of signal light components modulated in accordance with the electric signals EM1 to EM4. The signal light components propagate through optical waveguides WG7 to WG10 and reach the grating couplers GC7 to GC10.

Figure 3A:
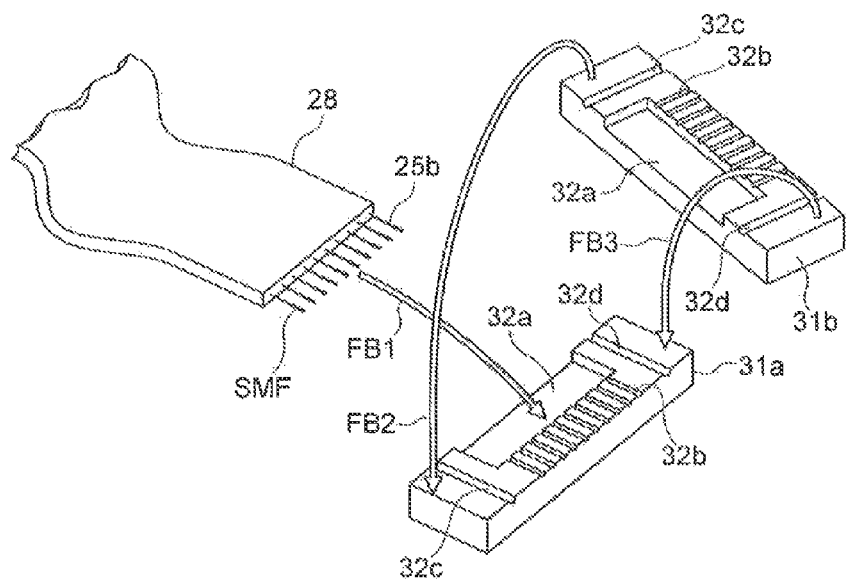
FIGS. 3A to 3D illustrate an example of an optical connector unit according to the embodiment.

FIGS. 3A to 3D illustrate an example of an optical connector unit. In this embodiment, the optical fiber bundle 28 includes a plurality of single-mode optical fibers (for example, ten single-mode optical fibers) SMF. These optical fibers SMF are held by a flexible resin member that functions as the flexible holding member 27. As illustrated in FIG. 3A, the optical fibers SMF project from the flexible resin member at one and the other ends of the optical fiber bundle 28. One end portion of the optical fiber bundle 28 is sandwiched between a connector member 31a and a connector member 31b. An end portion of the flexible resin member at the one end portion of the optical fiber bundle 28 is disposed in recesses 32a formed in the connector members 31a and 31b. The recesses 32a extend from rear end surfaces of the connector members 31a and 31b in the directions of axes that extend from the rear end surfaces to front end surfaces of the connector members 31a and 31b. End portions 25b of the single-mode optical fibers SMF that project from the flexible resin member at the one end portion of the optical fiber bundle 28 are disposed in fiber grooves 32b formed in the connector members 31a and 31b. The fiber grooves 32b extend from the front end surfaces of the connector members 31a and 31b in the directions of axes that extend from the rear end surfaces to front end surfaces of the connector members 31a and 31b. If necessary, the connector members 31a and 31b have guide-pin grooves 32c and 32d that receive positioning pins when the optical connector is connected. The guide-pin grooves 32c and 32d extend from the front end surfaces to the rear end surfaces of the connector members 31a and 31b in the directions of axes that extend from the rear end surfaces to front end surfaces of the connector members 31a and 31b.

FIG. 3A shows arrows FB1, FB2, and FB3. The end portion of the optical fiber bundle 28 is placed on the connector member 31a as shown by the arrow FB1, and then the connector member 31b is stacked on the connector member 31a as shown by the arrows FB2 and FB3. The optical fiber bundle 28, the connector member 31a, and the connector member 31b are fixed together to form the first optical connector 29. The second optical connector 31 may have a structure similar to that of the first optical connector 29, and is formed by a method similar to the method for forming the first optical connector 29. The second optical connector 31 is not connected to an external optical component, and is connected to the optical integrated circuit 19. Therefore, the guide-pin grooves for positioning need not be formed in the second optical connector 31.

Figure 3B:
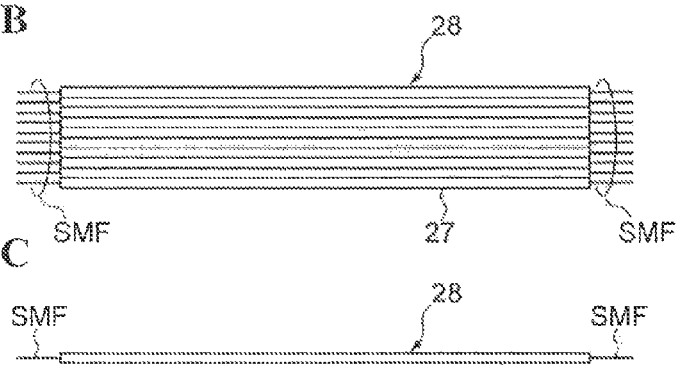
Figure 3C:
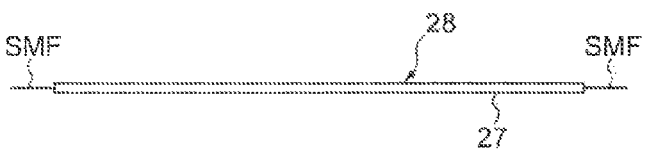

As illustrated in FIGS. 3B and 3C, the optical fiber bundle 28 may extend along a single reference plane. In this configuration, all of the optical fibers SMF are arranged along the single reference plane. The spaces between the single-mode optical fibers SMF that form a fiber array along the single reference plane are filled with the flexible resin member, and side surfaces of the individual single-mode optical fibers SMF are covered with the flexible resin member.

Figure 3D:
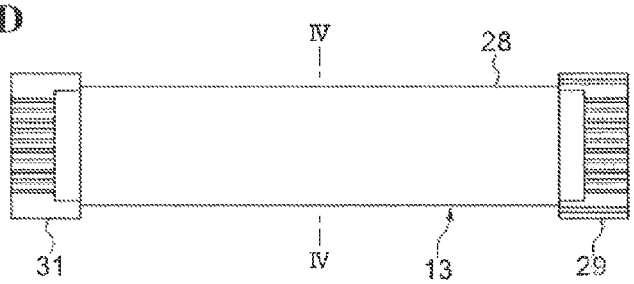

FIG. 3D illustrates an optical connector unit manufactured by the above-described method. When the optical fiber bundle 28 of the optical connector unit 13 is bent, the single-mode optical fibers SMF included in the optical fiber bundle 28 are bent in a similar manner. The force applied to the single-mode optical fibers SMF by the flexible resin member causes the single-mode optical fibers SMF to be bent at substantially the same bending radius.

An example of an optical connector will be described. An end portion of a tape-shaped ultraviolet (UV) curable resin member is placed in a recess formed in a connector member, and bare fibers are individually placed in grooves of a V-groove array formed in the connector member. Two connector members are assembled so as to sandwich the tape-shaped UV curable resin member and the optical fibers. An end surface of the assembly of the connector members is polished so that end portions of the optical fibers are aligned. As a result of the polishing process, end surfaces of the optical fibers are exposed at the end surface of the connector. The connector members included in the second optical connector 31 are preferably made of a glass, such as quartz. The connector members included in the second optical connector 31 are not provided with guide-pin grooves. The connector members included in the first optical connector 29 are preferably made of a resin, such as polyphenylene sulfide containing quartz filler. The connector members included in the first optical connector 29 are provided with guide-pin grooves. The guide-pin grooves are used to position connectors that are to be connected to each other. The first optical connector 29 and the second optical connector 31 may have, for example, a mechanically transferable (MT) connector structure.

Figure 4:
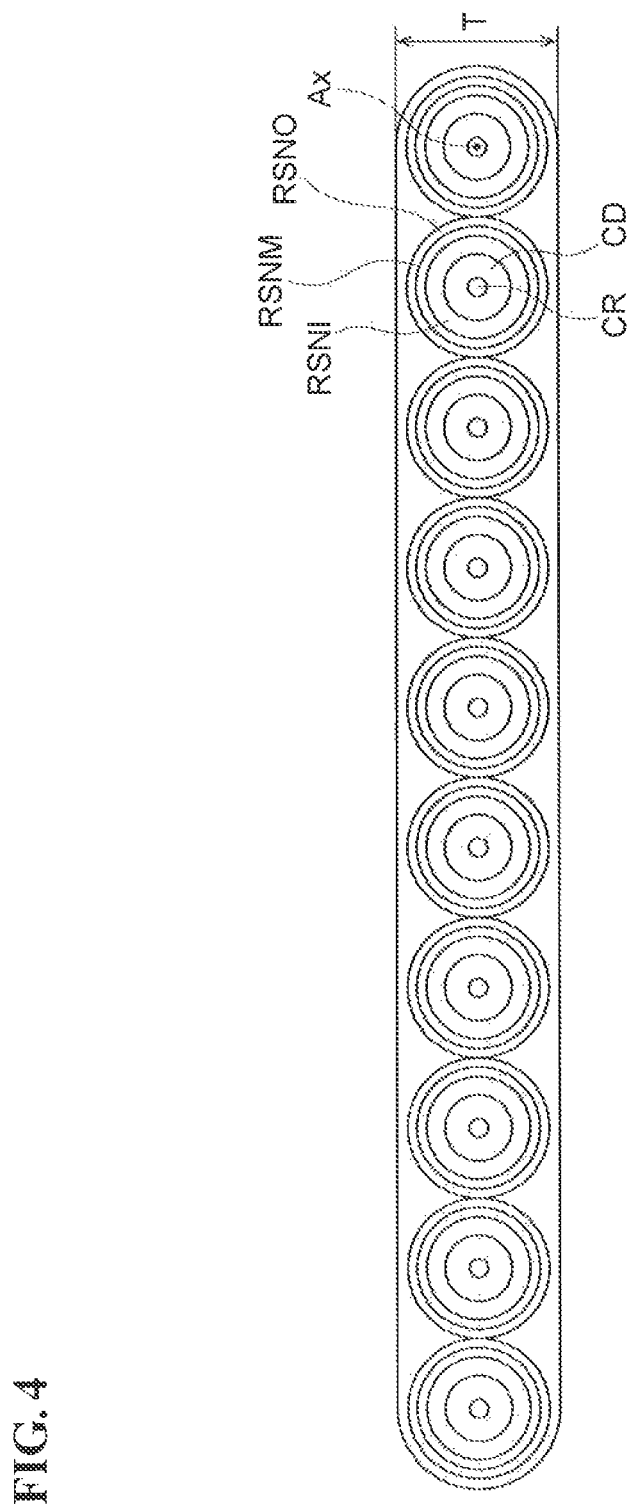
FIG. 4 illustrates an exemplary structure of an optical fiber bundle according to the embodiment.

FIG. 4 illustrates an exemplary structure of the optical fiber bundle 28 along a cross section taken along line IV-IV in FIG. 3D. The single-mode optical fibers SMF have the following structure. That is, the optical fibers SMF are made of a quartz glass, and the bare fiber of each optical fiber SMF includes a core CR and a cladding CD. The core CR extends in the direction of a waveguide axis Ax. The waveguide axis Ax extends in a direction perpendicular to the plane of FIG. 4. The cladding CD covers the periphery of the core CR. The outer diameter of the bare fiber is, for example, 80 µm. The side surface of the bare fiber is covered with a primary coating layer RSNI, and the primary coating layer RSNI includes, for example, a UV curable resin having a low Young's modulus. The outer diameter of the primary coating layer RSNI is, for example, 200 µm. The side surface of the primary coating layer RSNI is covered with a secondary coating layer RSNM, and the secondary coating layer RSNM includes, for example, a UV curable resin having a high Young's modulus. The secondary coating layer RSNM has a diameter of, for example, 240 µm. The side surface of the secondary coating layer RSNM is covered with a colored coating layer RSNO, and the colored coating layer RSNO includes, for example, a UV curable resin. The outer diameter of the colored coating layer RSNO, that is, the outer diameter of each single-mode optical fiber SMF, is, for example, 250 µm. The optical fibers SMF are connected to each other by a tape-shaped resin member (flexible resin member), thereby forming an optical fiber tape having a thickness of, for example, about 0.3 mm. The thickness T of the flexible resin member included in the optical fiber bundle 28 is about 0.3 mm.

An example of the optical fiber tape will be described. A single-mode fiber includes a bare fiber including a core and a cladding, a primary coating, a secondary coating, and a colored coating. The rigidity of the coating resin decreases in the order of the primary coating layer, the secondary coating layer, and the tape-shaped UV curable resin. The optical fiber tape is structured such that a plurality of bare fibers (two bare fibers, for example, and preferably three or more bare fibers) are coated with a UV curable resin. The bare fibers are arranged in a single direction that crosses the direction in which the bare fibers extend. The bare fibers are disposed at positions fixed by the tape-shaped UV curable resin, and are arranged in a single line so as to form a flat, tape-shaped structure.

FIGS. 5A to 5C illustrate the manner in which the optical connector unit 13 is bent. Referring to FIG. 5A, the optical fiber bundle 28 of the optical connector unit 13 cannot be easily bent around an X-axis of a coordinate system S as shown by the arrow BX. However, referring to FIG. 5B, the optical fiber bundle 28 of the optical connector unit 13 can be easily bent around a Y-axis of the coordinate system S as shown by the arrow BY. Referring to FIG. 5C, the optical fiber bundle 28 of the optical connector unit 13 cannot be easily bent around a Z-axis of the coordinate system S as shown by the arrow BZ.

As described above, the optical fiber bundle 28 may be bent as shown by the arrow BY, but is not easily bent as shown by the arrows BX and BZ. Thus, the optical fiber bundle 28 is bendable around a single axis, more specifically, the Y-axis. Therefore, the direction of birefringence in the fibers is limited to the direction of birefringence in the polarization maintaining fibers included in the external optical component.

Figure 6:
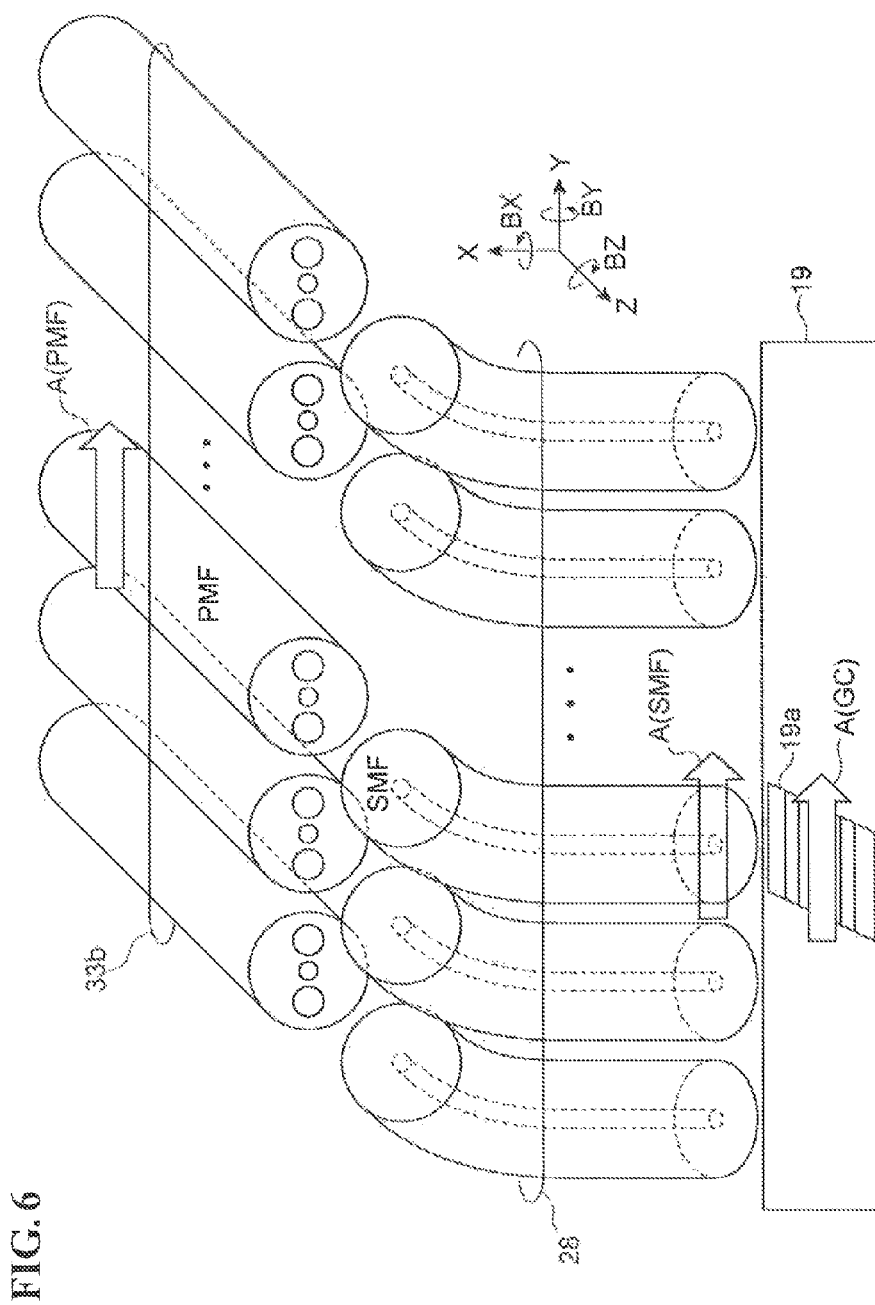
FIG. 6 illustrates the arrangement of polarization maintaining fibers (PMFs) included in an external optical component and single-mode optical fibers (SMFs) included in an optical fiber bundle that is bent so as to connect the external optical component to an optical integrated circuit.

FIG. 6 illustrates the arrangement of the polarization maintaining fibers (PMFs) included in the external optical component and the single-mode optical fibers (SMFs) included in the optical fiber bundle that is bent so as to connect the external optical component to the optical integrated circuit. As illustrated in FIG. 6, the single-mode optical fibers (SMFs) are bundled together by a resin member (flexible holding member 27) to form the optical fiber bundle 28. The optical fibers SMFs are bent so as to connect the external optical component 33 including the array of the polarization maintaining fibers (PMFs) to the optical integrated circuit 19. As described above, the optical fiber bundle 28 is bendable as shown by the arrow BY in FIG. 5B, and is not easily bent as shown by the arrows BX and BZ. Thus, the optical fiber bundle 28 is bendable around a single axis. More specifically, the optical fiber bundle 28 is bendable only around the Y-axis. Therefore, the single-mode optical fibers (SMFs) included in the optical fiber bundle 28 receive stress in the same direction. The polarization maintaining fiber tape 33b is optically coupled to the optical integrated circuit 19 by the optical fiber bundle 28, which is bent in this manner. The direction of plane of polarization A(PMF) in the polarization maintaining fiber tape 33b is maintained as the direction of plane of polarization A(SMF) when the polarized light propagates through the bent optical fibers (SMFs). The plane of polarization of the polarized light that has propagated through the optical fibers (SMFs) is oriented in the direction of plane of polarization A(GC) in the grating couplers (optical couplers 19a).

Figure 7:
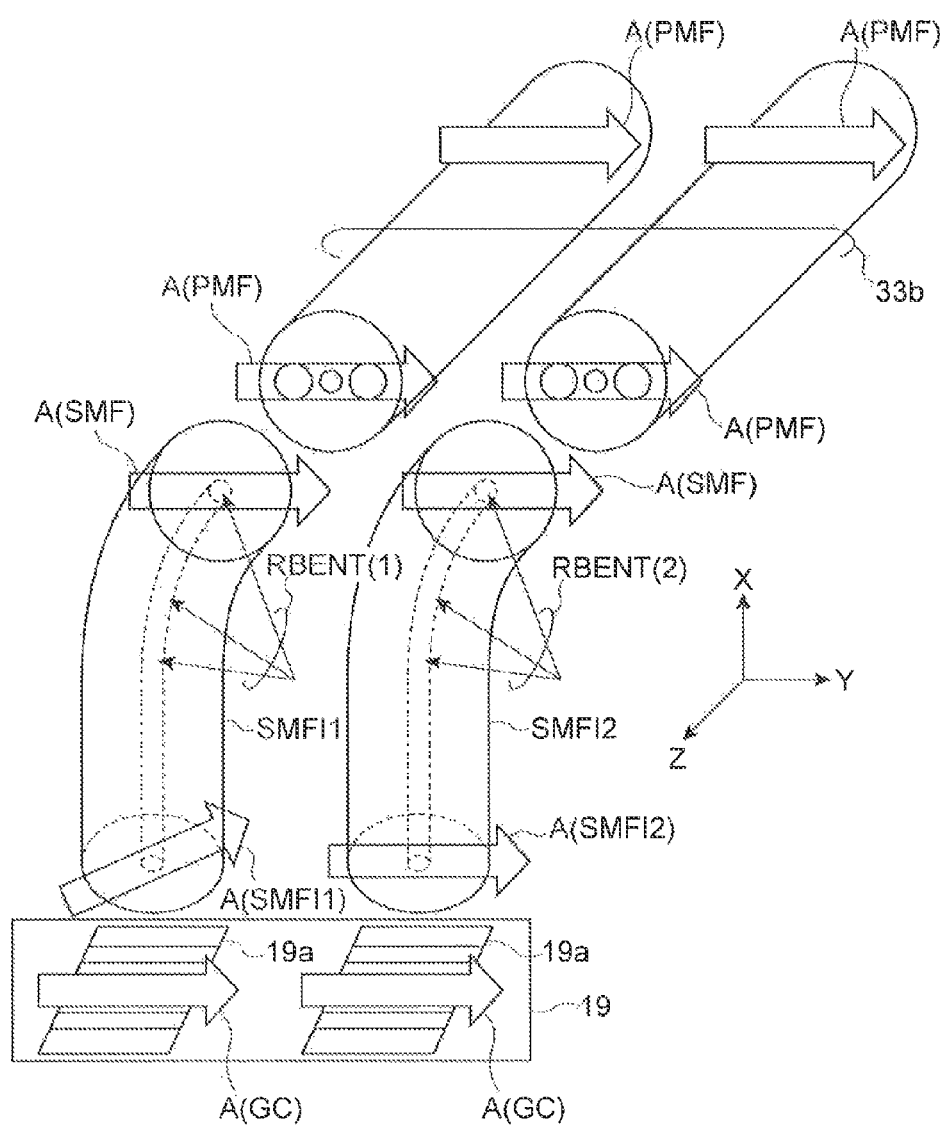
FIG. 7 illustrates the arrangement of the polarization maintaining fibers (PMFs) included in the external optical component and separate single-mode optical fibers (SMFI1 and SMFI2) that are bent so as to connect the external optical component to the optical integrated circuit.

FIG. 7 illustrates the arrangement of the polarization maintaining fibers (PMFs) included in the external optical component and a plurality of separate single-mode optical fibers (SMFI1 and SMFI2) that are bent so as to connect the external optical component to the optical integrated circuit. The separate optical fibers (SMFI1 and SMFI2) are not bundled together to form an optical fiber bundle. The separate optical fibers (SMFI1 and SMFI2) are independently bent around the coordinate axes X, Y, and Z. Therefore, the manner in which the separate optical fiber (SMFI1) is bent (RBENT(1)) differs from the manner in which the separate optical fiber (SMFI2) is bent (RBENT(2)). The separate optical fibers (SMFI1 and SMFI2) receive light whose plane of polarization is in the direction A(PMF) as light whose plane of polarization is in the direction A(SMF) from the polarization maintaining fibers (PMFs) included in the external optical component 33 at the entrance ends thereof. When the light propagates through each of the separate optical fibers (SMFI1 and SMFI2), the plane of polarization of the light in the optical fibers (SMFI1 and SMFI2) changes differently depending on the manner in which the separate optical fibers (SMFI1 and SMFI2) are bent. The separate optical fibers (SMFI1 and SMFI2) emit light whose plane of polarization is in directions A(SMFI1) and A(SMFI2), respectively, at the exit ends thereof. There is a possibility that the directions of plane of polarization A(SMFI1) and A(SMFI2) at the exit ends differ from the direction of plane of polarization A(GC) in the grating couplers (optical couplers 19a). In the case where the light propagates in the opposite direction, the direction of plane of polarization A(GC) in the grating couplers (optical couplers 19a) may be read as the direction of plane of polarization A(PMF) in the polarization maintaining fibers (PMF) in the above discussion.

Figure 8A:
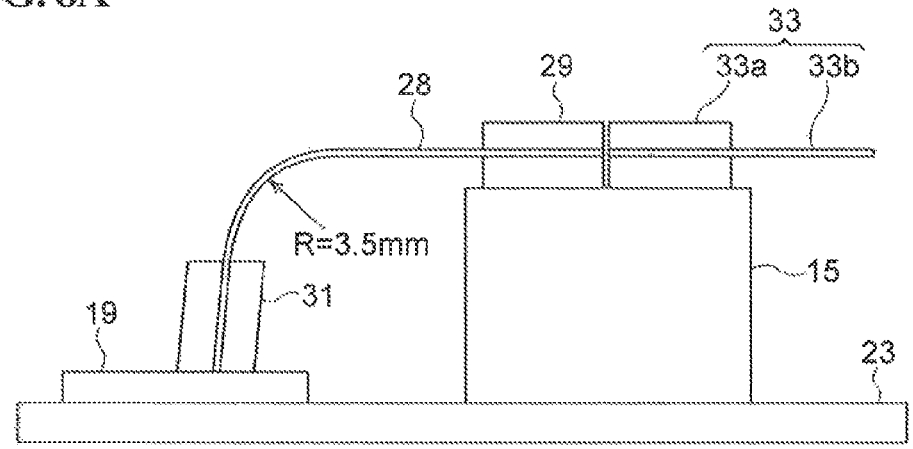
FIGS. 8A to 8C illustrate variations of optical signal processors.
Figure 8B:
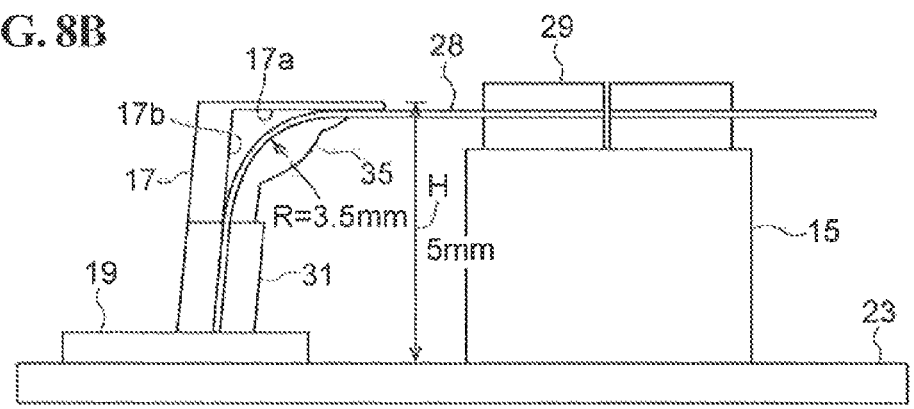
Figure 8C:
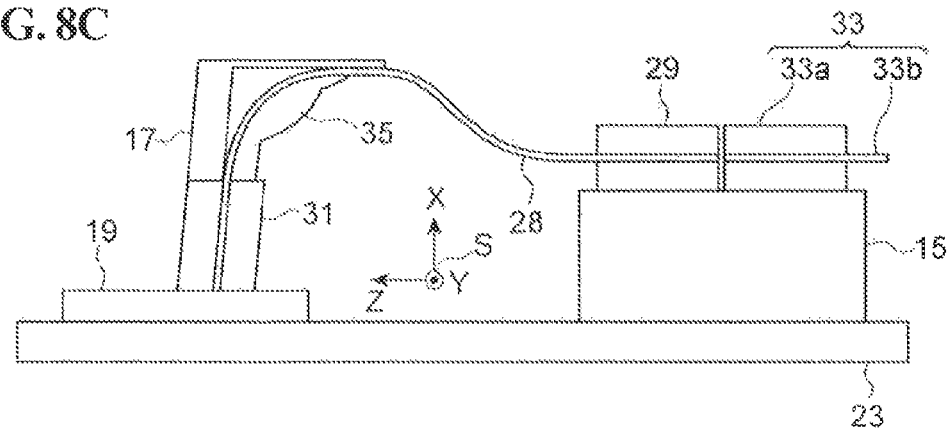

FIGS. 8A to 8C illustrate variations of optical signal processors. To facilitate understanding, the base 23, the optical integrated circuit 19, and the external optical component 33 are illustrated in FIGS. 8A to 8C.

The bending amount by which the optical connector unit 13 is bent in FIG. 8A is determined as follows. That is, to determine the bending amount, the height of the supporting block 15 is determined. Thus, the height at which the first optical connector 29 is disposed above the base 23 is determined. In addition to the position of the first optical connector 29 on the supporting block 15, the position of the second optical connector 31 on the optical integrated circuit 19 is determined. In addition, the length of the optical fiber bundle 28 (length of the optical fibers that connect the first optical connector 29 to the second optical connector 31) is determined. In this embodiment, the bending amount of the optical fiber bundle 28 corresponds to a bending radius of, for example, 3.5 mm.

In FIG. 8A, the optical fiber bundle 28 includes a substantially linear portion disposed between the bent portion that is bent in an arc shape at a bending radius of 3.5 mm and the first optical connector 29. The bent portion has a polarization maintaining characteristic based on the bending stress, and the linear portion does not have the polarization maintaining characteristic. When a disturbance is applied to the linear portion, the plane of polarization varies. Therefore, the linear portion is preferably as short as possible. In the example illustrated in FIG. 8A, the linear portion that extends from the right end of the first optical connector 29 to the bending portion of the optical fiber bundle 28 is as short as about 20 to 50 mm. Thus, the linear portion is prevented from receiving a disturbance that leads to variation in the plane of polarization.

In FIG. 5B, the bending portion of the optical fiber bundle 28 is supported by the cover plate 17. The angle at which the first support surface 17a and the second support surface 17b of the cover plate 17 intersect is determined in accordance with the bending amount of the optical connector unit 13. The first optical connector 29 is disposed on the supporting block 15 at a predetermined position, and the second optical connector 31 is arranged at a predetermined angle and position with respect to the supporting block 15. For example, the second optical connector 31 is connected to the optical integrated circuit 19. With this arrangement, the optical fiber bundle 28 of the optical connector unit 13 is bent as designed. To maintain the bent state, as illustrated in FIG. 8B, the cover plate 17 is attached to the second optical connector 31. The optical fiber bundle 28 is brought into contact with the first support surface 17a and the second support surface 17b of the cover plate 17. If necessary, the adhesive member 35 may be used to reliably maintain the shape of the optical fiber bundle 28.

Since the optical fiber bundle 28 includes single-mode fibers, as illustrated in FIG. 8B, the optical connector unit 13 may be bent at a bending radius smaller than the bending radius at which the polarization maintaining fibers may be bent. Since the optical fiber bundle 28 is provided with the cover plate 17, there is no risk that the bending radius of the optical fibers will be smaller than the bending radius determined by the cover plate 17. In this embodiment, the bending radius is, for example, 3.5 mm. The height H from the connection end of the second optical connector 31 to the first support surface 17a of the cover plate 17, including the size of the second optical connector 31, may be about 5 mm.

The optical signal processor and the optical assembly according to this embodiment are not limited to those in FIG. 8B, and may instead be structured as illustrated in FIG. 8C. The optical fibers included in the optical connector unit 13 may be bent not only in one direction but also in the opposite direction as long as the optical fibers are bent around a single coordinate axis. Also in this embodiment, since the optical connector unit 13 is bent, the direction of plane of polarization can be maintained. Since the length of the linear portion of the optical fiber bundle 28 can be reduced compared to that in FIGS. 8A and 8B, the polarization maintaining performance can be improved.

The polarization maintaining optical fibers are structured such that the internal stress is generated therein, and are therefore arranged so as not to be bent at a relatively small bending radius. When the polarization maintaining optical fibers are bent at a small bending radius, the fatigue lifetime of the fibers is reduced. The polarization maintaining optical fibers cannot be bent at a bending radius that is smaller than or equal to 15 mm. Accordingly, in the case where the polarization maintaining optical fibers are directly connected to grating couplers of an optical integrated device manufactured by Si photonics technology, there is a possibility that the lower limit of the height of a light receiving-and-transmitting device is determined by how the polarization maintaining optical fibers are bent.

The lower limit of the bending radius of single-mode optical fibers, which have no polarization maintaining characteristic, is lower than that of the bending radius of polarization maintaining optical fibers. However, according to the knowledge of the inventors, when a single-mode optical fiber that is about 1 to 5 cm long is bent around a predetermined axis (for example, Y-axis) to optically couple a polarization maintaining optical fiber to a grating coupler of an optical integrated device, the short single-mode optical fiber is easily bent and twisted not only around the predetermined axis (for example, the Y-axis) but also around the remaining two axes (X-axis and Z-axis). The twisting of the optical fiber may induce a disturbance in the polarization control.

In the optical connector unit, the optical signal processor, and the optical assembly of this embodiment, the single-mode fibers to be bent are bundled together by a flexible resin member so as to be arranged in a single direction (for example, along a single plane), thereby being formed into a tape having a certain width. With this structure, the fibers are not easily bent or twisted in undesirable directions. As a result, the disturbance due to bending or twisting of the fibers in undesirable directions does not occur in the polarization control. MT connectors may be provided at both ends of the bent single-mode fibers. When these optical connectors are used, the optical fibers that are bundled together may be collectively connected to the polarization maintaining optical fibers and the optical integrated device.

As described above, according to this embodiment, fibers may be bent at a small bending radius (the height of the assembly may be reduced) by using single-mode fibers in a section where the bending radius needs to be reduced. In addition, the direction of the principal axis of birefringence in the single-mode fibers in the bent state is set so as to match the direction of the principal axis of birefringence in the polarization maintaining optical fibers, so that the plane of polarization can be maintained while the light propagates through the single-mode fibers.

Although the principle of the present invention has been illustrated and explained in the description of the preferred embodiments, it is to be understood by those skilled in the art that the arrangements and details may be changed without departing from the principle of the present invention. The present invention is not limited to specific structures disclosed in the embodiments. Therefore, the invention sought to be patented includes all modifications and changes within the scope of the claims and the spirit thereof.

What is claimed is:

1. An optical signal processor comprising:
   a plurality of optical fibers arranged in a first direction, each optical fiber having a side surface and two end surfaces;
   a flexible holding member covering the side surfaces of the plurality of optical fibers;
   a first optical connector having a first end face and a second end face opposite to the first end face;
   a second optical connector having a third end face and a fourth end face opposite to the third end face;
   a supporting block disposed under the first optical connector; and
   an optical integrated circuit including a plurality of optical couplers facing the third end face of the second optical connector and a plurality of optical waveguides, the plurality of optical couplers being optically coupled to the plurality of optical fibers, wherein
   the plurality of optical fibers extends from the second end face of the first optical connector in a second direction that intersects with the first direction,
   the plurality of optical fibers extends from the fourth end face of the second optical connector in a third direction that intersects with the second direction, and
   the flexible holding member has a bending portion located between the first optical connector and the second optical connector.

2. The optical signal processor according to claim 1, wherein
   the plurality of optical fibers is optically connected to a plurality of polarization maintaining fibers via the first end face of the first optical connector, and
   the plurality of couplers of the optical integrated circuit transmits polarized light via the third end face of the second optical coupler.

3. The optical signal processor according to claim 1, further comprising:
   a cover plate that covers the bending portion of the flexible holding member.

4. The optical signal processor according to claim 3, wherein
   the cover plate includes a first surface extending in the second direction and a second surface extending in the third direction,
   the first surface is in contact with the flexible holding member at least at one portion between the first optical connector and the bending portion,
   the second surface is in contact with the flexible holding member at least at one portion between the second optical connector and the bending portion, and
   the first surface and the second surface are connected to each other.

5. The optical signal processor according to claim 1, wherein
   one end surface of each optical fiber is exposed at the first end face of the first optical connector, and
   the other end surface of each optical fiber is exposed at the third end surface of the second optical connector.

6. The optical signal processor according to claim 1, further comprising:
a base having a main surface,
wherein the supporting block and the optical integrated circuit are disposed on the main surface of the base.

7. The optical signal processor according to claim 1, wherein
the optical integrated circuit includes a silicon photonics device, and
the plurality of optical couplers includes a plurality of grating couplers.

* * * * *